United States Patent [19]

Stuedemann

[11] Patent Number: 4,991,458
[45] Date of Patent: Feb. 12, 1991

[54] ANTI-THEFT STEERING SHAFT LOCK

[75] Inventor: Richard T. Stuedemann, Saginaw, Mich.

[73] Assignee: General Motors Corporation, Detroit, Mich.

[21] Appl. No.: 473,758

[22] Filed: Feb. 2, 1990

[51] Int. Cl.⁵ .................. B62D 1/16; B60R 25/02
[52] U.S. Cl. ........................ 74/492; 74/493; 70/252; 188/336
[58] Field of Search ............. 74/492, 493; 70/185, 70/186, 252; 188/336

[56] References Cited

U.S. PATENT DOCUMENTS

| | | | |
|---|---|---|---|
| 1,341,281 | 5/1920 | Randolph | 70/183 |
| 1,381,000 | 6/1921 | Mueller | 70/252 |
| 1,487,863 | 3/1924 | Lavigne | 70/183 |
| 3,382,953 | 5/1968 | Wilkinson | 188/336 |
| 3,566,633 | 3/1971 | Borck | 70/252 |
| 3,566,634 | 3/1971 | Borck | 70/252 |
| 3,732,710 | 5/1973 | Rhodes et al. | 70/239 |
| 4,029,168 | 6/1977 | Kramer | 74/493 X |
| 4,033,158 | 7/1977 | Chamberlain et al. | 74/493 X |
| 4,552,000 | 11/1985 | Lipschutz | 70/185 |
| 4,559,795 | 12/1985 | Zagoroff | 70/422 |
| 4,570,468 | 2/1986 | Bemm et al. | 70/252 |
| 4,750,380 | 6/1988 | Hoblingre et al. | 74/556 |

Primary Examiner—Allan D. Herrmann
Assistant Examiner—David W. Laub
Attorney, Agent, or Firm—Saul Schwartz

[57] ABSTRACT

An anti-theft steering shaft lock includes a longitudinally split elastomeric clutch sleeve, a non-cylindrical cam section on the steering shaft, and a transverse lock bolt bodily shiftable between extended and retracted positions. The sleeve has a right cylindrical outside surface and a non-cylindrical inside surface matching the cam section on the steering shaft. The sleeve fits on the cam section and within a cylindrical bore in a stationary housing on which the shaft is rotatably supported, the bore having a greater diameter than the sleeve so that the steering shaft and sleeve are normally freely rotatable relative to the housing. In its extended position, the lock bolt projects into the slot in the split sleeve to prevent rotation of the sleeve with the steering shaft. The cam section expands and wedges the sleeve against the bore in the housing when the steering shaft is rotated relative to the sleeve. The annular gap between the sleeve and the cylindrical bore accommodates a few degrees of rotation of the shaft relative to the sleeve before the sleeve is wedged. The few degrees of steering shaft rotation dissipates residual restoring torque in the steering system.

3 Claims, 1 Drawing Sheet

ANTI-THEFT STEERING SHAFT LOCK

FIELD OF THE INVENTION

This invention relates to anti-theft steering shaft locks in automobile steering columns.

BACKGROUND OF THE INVENTION

In steering shaft locks characterized by a radial bolt projecting into a slot in the steering shaft, the bolt is usually actuated by an ignition lock key so that the shaft is unlocked except when the ignition is locked and the vehicle unattended. In such anti-theft locks, residual restoring torque in the steering system may create frictional resistance to withdrawal of the bolt from the slot of sufficient magnitude to impede turning the ignition lock key. The frictional resistance is dissipated if the steering shaft is permitted to rotate or unwind a few degrees after the steering shaft lock is engaged. To that end, one prior steering shaft lock proposal includes a roller clutch having rollers disposed between an outside cylindrical surface of the steering shaft and a non-cylindrical inside surface of a stationary clamping ring. The rollers are separated by a cage which is held stationary for normal steering and which is released for locking. When the cage is held stationary, the rollers are held in wide radial gaps between the steering shaft and the clamping ring. When the cage is released, the rollers wedge between the steering shaft and the clamping ring after a few degrees of angular movement of the steering shaft. A steering shaft lock according to this invention includes a simple sleeve clutch between the steering shaft and a surrounding stationary housing for effectively immobilizing the steering shaft after a few degrees of rotation.

SUMMARY OF THE INVENTION

This invention is a new and improved anti-theft steering shaft lock including a sleeve clutch between the steering shaft and a surrounding stationary housing on which the steering shaft is rotatably supported. The sleeve clutch includes an elastomeric, longitudinally split sleeve the wall of which is cylindrical on the outside and non-cylindrical on the inside. The sleeve fits closely over a cam section on the steering shaft shaped to correspond to the inside of the sleeve. The sleeve rotates with the steering shaft inside a cylindrical bore of the stationary housing slightly larger than the sleeve. In a locked position, the bolt projects into the longitudinal gap in the sleeve. When the bolt is withdrawn to an unlocked position for normal steering, the outside of the sleeve is uniformly spaced from the cylindrical bore in the stationary housing so that the sleeve and steering shaft are freely rotatable relative to the stationary housing. In the locked position, the bolt prevents the sleeve from rotating relative to the housing. If residual restoring torque unwinds the steering shaft after the bolt is projected to its locked position, the cam on the steering shaft progressively expands the sleeve to relieve the wind-up. Manually rotating the steering shaft with the bolt in its locked position causes the cam to wedge the sleeve against the surrounding cylindrical bore. Thereafter, the steering shaft is rotatable only to the extent that the wall of the sleeve is compressible. The degree to which the steering shaft is free to unwind is a function of the wall thickness of the sleeve and the the clearance between the sleeve and the surrounding cylindrical bore in the housing. The degree of resistance to rotation after the sleeve is wedged between the cam section and the surrounding bore is a function of the modulus of elasticity of the material from which the sleeve is made.

DESCRIPTION OF A PREFERRED EMBODIMENT

Figure 1:
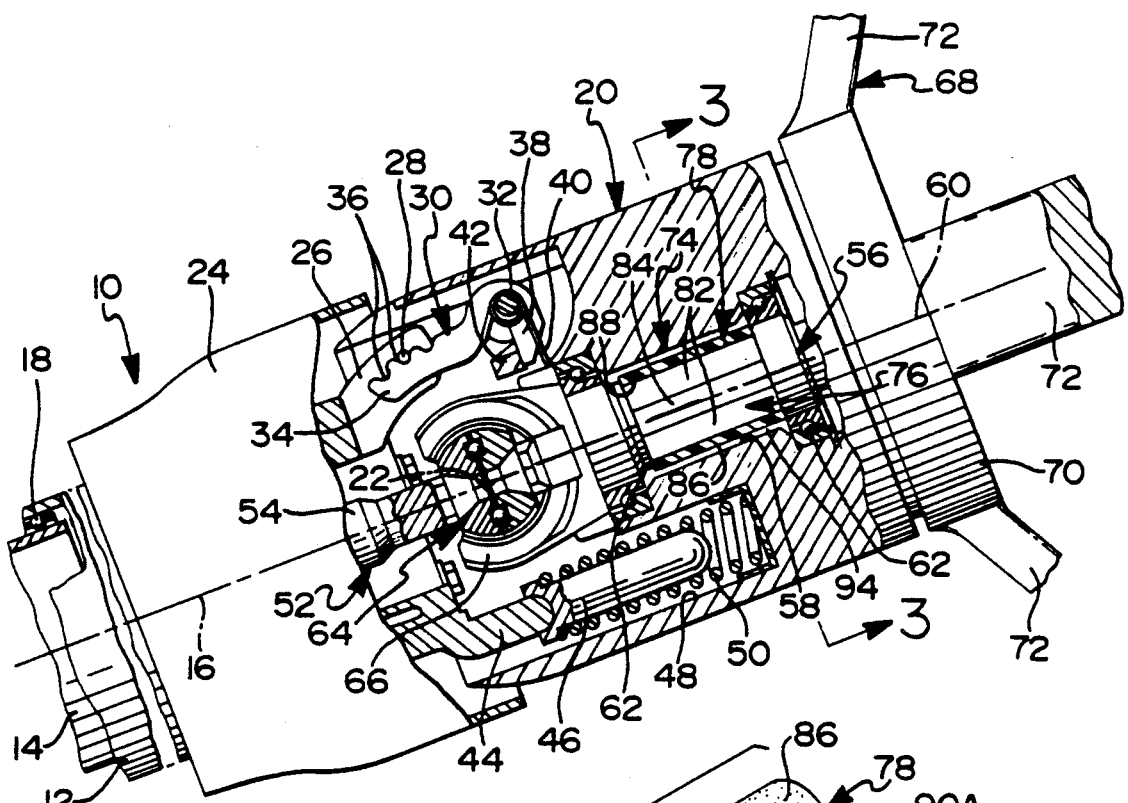
FIG. 1 is a fragmentary, partially broken-away side view of an automobile steering column having an anti-theft steering shaft lock according to this invention.

As seen best in FIG. 1, a steering column 10 includes a tubular upper mast jacket 12 and a tubular lower mast jacket 14 each aligned on a lower longitudinal centerline 16 of the steering column. The lower end of the upper mast jacket overlaps the outside of the upper end of the lower mast jacket and a plurality of roll deformer energy absorbers 18 are disposed in the annulus defined by the overlap. When the upper mast jacket is forced telescopically down over the lower mast jacket, the overlap increases and the roll deformers absorb energy by plastically deforming the mast jackets.

A tilt-housing 20 is mounted on the upper end of the upper mast jacket 12 for bodily movement as a unit therewith in the direction of lower centerline 16. In addition, the tilt-housing is pivotable up and down relative to the upper mast jacket about a transverse axis 22 which intersects the lower centerline 16. A bezel 24 on the upper mast jacket shrouds the lower end of the tilt-housing 20.

A rigid extension 26 of the upper mast jacket 12 has a pin 28 thereon. An L-shaped lock shoe 30 is supported on the tilt-housing 20 for pivotal movement relative to the latter about a support pin 32. The lock shoe has a long leg 34 with a plurality of notches 36 thereon and a short leg 38. A spring 40 biases the shoe 30 such that the long leg is urged against the pin 28. The lock shoe 30 captures the angular position of the tilt-housing relative to the upper mast jacket when the pin 28 is seated in one of the notches 36 on the long leg 34. A release lever 42 on the tilt-housing 20 adjacent the short leg 38 of the lock shoe is manually movable against the short leg to withdraw the long leg from the pin 28 to release the tilt-housing for up and down pivotal movement about the transverse axis 22.

A second rigid extension 44 of the upper mast jacket 12 supports a spring seat 46 in a pocket 48 of the tilt-housing. A compression spring 50 is disposed in the pocket 48 and bears against the seat 46 and against the tilt-housing. The spring 50 biases the tilt-housing to a maximum up position, not shown.

A steering shaft assembly 52 of the steering column 10 includes a lower steering shaft 54 aligned on the lower centerline 16 and an upper steering shaft 56. The upper steering shaft is disposed in a cylindrical bore 58 in the tilt-housing aligned on an upper centerline 60 of the tilt-housing. A pair of ball bearings 62 between the upper steering shaft and the tilt-housing support the former on the latter for rotation about the upper centerline 60. The lower and upper centerlines 16,60 and the transverse axis 22 intersect at a common point. In the position of the tilt-housing illustrated in FIG. 1, the upper and lower centerlines are collinear. A universal joint 64, including a forked end 66 at the left or lower end of the upper steering shaft, is centered at the common intersection of the centerlines 16,60 and the transverse axis 22 and transfers torque between the upper and lower shafts 54,56.

A steering wheel 68 of the steering column 10 includes a hub 70 and a plurality of spokes 72 branching out from the hub. The hub is spline connected to the right or upper end of the upper steering shaft 56. Steering torque applied at the steering wheel is transferred to a steering gear, not shown, through the upper and lower steering shafts and the universal joint 64. An anti-theft steering shaft lock 74 according to this invention on the tilt-housing 20 effectively immobilizes the steering shaft assembly 52 when the vehicle is unattended.

Figure 2:
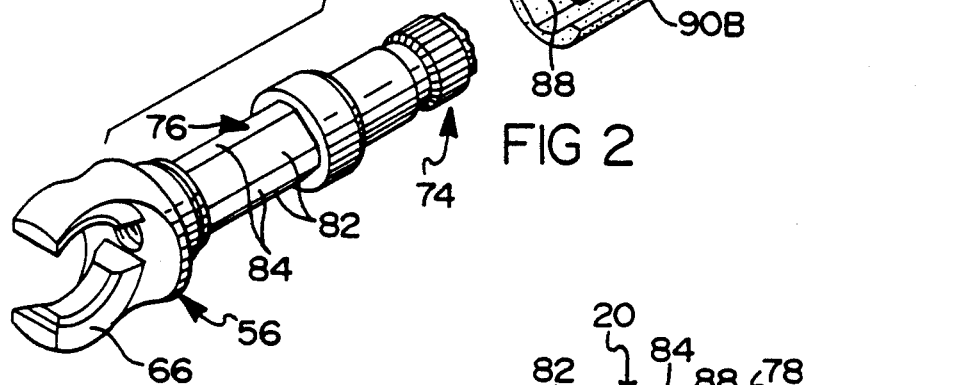
FIG. 2 is an exploded perspective view of a portion of FIG. 1.
Figure 3:
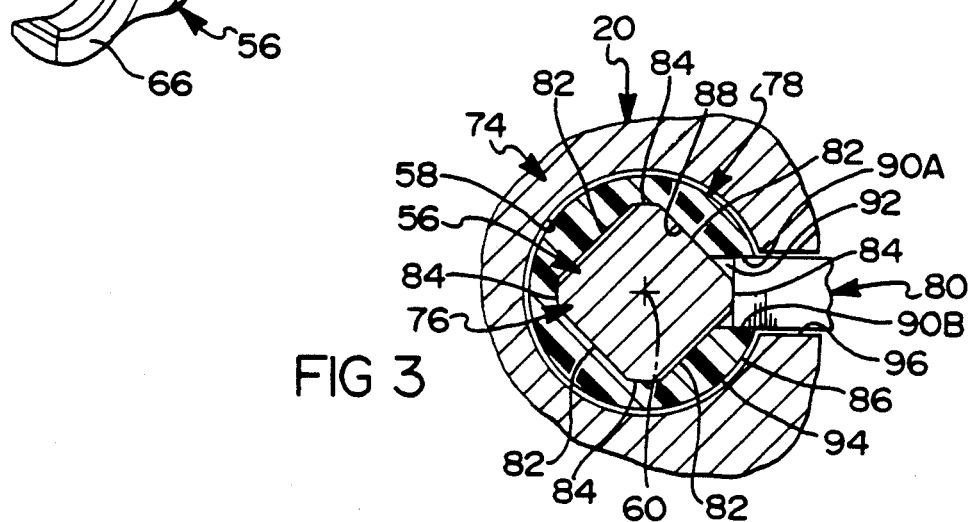
FIG. 3 is a sectional view taken generally along the plane indicated by lines 3—3 in FIG. 1.

Referring to FIGS. 1-3, the steering shaft lock 74 includes a cam section 76 of the upper steering shaft, a clutch sleeve 78, and a schematically represented lock bolt 80. The cam section 76 is located between the roller bearings 62 and is aligned on the upper centerline 60 of the tilt-housing. The cam section defines a polygon in cross-section and, preferably, a square, FIG. 3, including a plurality of flat sides 82 and a plurality of rounded corners 84 therebetween. The cam section may define non-cylindrical cross sections other than polygons.

The clutch sleeve 78 is a longitudinally split elastomeric tube, C-shaped in cross-section, having an outside wall 86 and an inside wall 88. The sleeve has a longitudinally extending first edge 90A and a longitudinally extending second edge 90B defining therebetween a slot 92 extending the full length of the sleeve. The outside wall 86 defines a right circular cylinder having a diameter smaller than the diameter of bore 58 in the tilt-housing. The inside wall 88 is non-cylindrical and corresponds to the shape of the cam section 76 of the upper steering shaft 56.

The clutch sleeve 78 is fitted over the cam section 76 by elastically expanding the sleeve and sliding it over the shaft. The natural resilience of the sleeve causes the latter to closely grip the cam section, FIG. 3. The difference between the diameters of the bore 58 and the outside wall 86 of the sleeve 78 defines an annular gap 94, FIGS. 1 and 3, between the sleeve and the tilt-housing.

The lock bolt 80 is disposed in a slot 96 in the tilt-housing 20 for transverse sliding movement relative to the upper centerline 60 of the tilt-housing. The width of the lock bolt corresponds generally to the width of the slot 92 between the longitudinal edges 90A-B. The lock bolt 80 is ignition key-controlled and has a retracted position, not shown, substantially completely withdrawn into the slot 96 and an extended position, FIG. 3, projecting into the slot 92 in the clutch sleeve. The lock bolt is in its retracted position when the ignition is unlocked and is in its extended position when the ignition is locked.

The anti-theft steering shaft lock 74 operates as follows. With the lock bolt 80 in its retracted position, the clutch sleeve closely grips the cam section 76 of the upper steering shaft. Because the sleeve is separated from the tilt-housing by the annular gap 94, the upper steering shaft is freely rotatable about the upper centerline 60 and the steering wheel is steerable as usual. When the ignition key turned to lock the ignition, the bolt 80 is projected to its extended position.

When the slot 92 in the clutch sleeve is in register with the bolt 80, the latter assumes its extended position in the slot. If torque is thereafter applied to the steering wheel 68, the upper steering shaft 56 starts to rotate relative to the housing 20 but the bolt prevents corresponding rotation of the sleeve. The corners 84 of the cam section thereupon expand the sleeve until it is wedged between the corners 84 and the bore 58 of the tilt-housing. Then, the steering wheel is further rotatable only against repeating compression pulses as the corners 84 on the cam section traverse the flat sides of the inside wall of the sleeve. It is a feature of this invention that the magnitude of the repeating resistance pulses to turning of the steering wheel can be tailored for specific applications by selection of the modulus of elasticity of the sleeve material.

If the slot 92 does not register with the lock bolt 80 when the ignition is turned off, some rotation of the steering shaft is required. Preferably, the lock bolt operating system, not shown, includes spring means for automatically projecting the bolt to its extended position when registry is achieved. In any event, the additional rotation of the steering shaft may be against a residual steering torque developed at the interface between the front tires and the pavement.

The residual steering torque rotates or unwinds the upper and lower steering shafts opposite the immediately preceding direction of rotation, thereby causing the cam section 76 to expand the clutch sleeve 78 as described above. As the sleeve expands, the residual steering torque is relieved so that there is little or no friction between the lock bolt and the longitudinal edges 90A-B defining the slot 92 in the sleeve 78 which friction would otherwise retard withdrawal of the bolt from the slot and thereby retard turning of the ignition key. It is a feature of this invention that the angular interval through which the steering shaft is allowed to unwind after the lock bolt 80 enters the slot 92 and before the sleeve 78 becomes wedged between the bore 58 and the cam section 76, is a function of the radial depth of the gap 94 and of the thickness of sleeve 78 and can be tailored for different applications by providing more or less radial depth and/or wall thickness.

The embodiments of the invention in which an exclusive property or privilege is claimed are defined as follows:

1. In a steering column having a housing and a steering shaft supported on said housing for rotation about a longitudinal centerline of said housing,
an anti-theft steering shaft lock comprising:
means defining a cylindrical bore in said housing centered on said longitudinal centerline and surrounding said steering shaft,
means on said steering shaft defining a non-cylindrical cam section surrounded by said cylindrical bore,
a longitudinally split elastomeric clutch sleeve on said cam section of said steering shaft having a right cylindrical outside surface smaller than said cylindrical bore and a non-cylindrical inside surface corresponding to the shape of said non-cylindrical cam section of said steering shaft and a longitudinal slot extending the full length of said clutch sleeve,
said cam section radially expanding said clutch sleeve when said steering shaft rotates relative to said clutch sleeve, and
a lock bolt supported on said housing for transverse bodily movement relative to said longitudinal centerline between an extended position projecting into said longitudinal slot in said clutch sleeve to prevent rotation thereof with said steering shaft and a retracted position withdrawn from said longitudinal slot, said cam section wedging said clutch sleeve against said cylindrical bore with said lock bolt in said extended position after predetermined relative rotation between said steering shaft and said clutch sleeve thereby to impede rotation of said steering shaft relative to said housing.

2. The anti-theft steering shaft lock recited in claim 1 wherein
said cam section of said steering shaft defines a polygon in cross section.

3. The anti-theft steering shaft lock recited in claim 2 wherein said polygon is a square.

* * * * *